No. 743,320. PATENTED NOV. 3, 1903.
L. C. OTTO.
TRIPOD.
APPLICATION FILED JAN. 29, 1903.
NO MODEL.
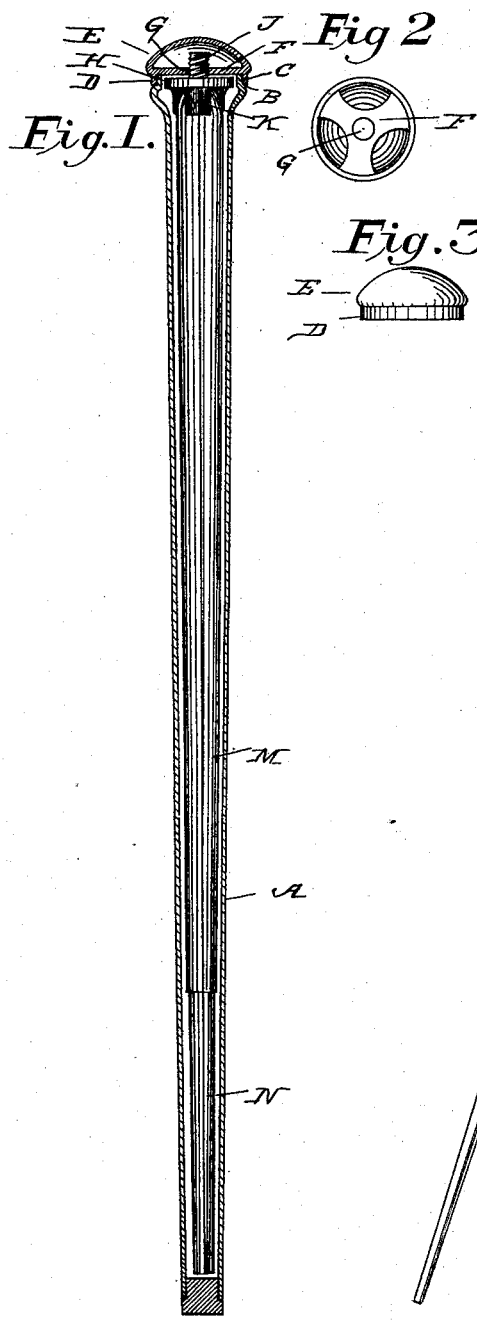
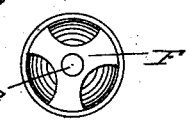
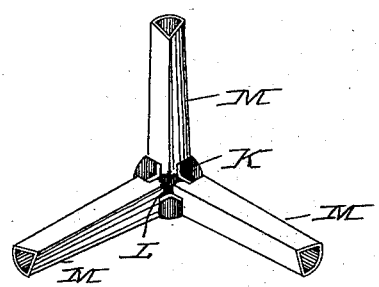
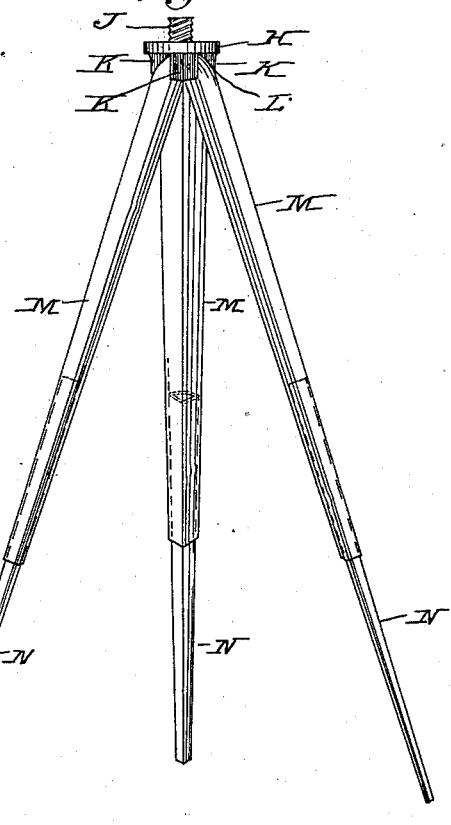
Witnesses
M. E. Moore
C. C. Clements
Inventor
Leo C Otto.
By Wm N Moore
His Attorney No. 743,320. Patented November 3, 1903.

UNITED STATES PATENT OFFICE.

LEO C. OTTO, OF DULUTH, MINNESOTA.

TRIPOD.

SPECIFICATION forming part of Letters Patent No. 743,320, dated November 3, 1903.

Application filed January 29, 1903. Serial No. 141,003. (No model.)

*To all whom it may concern:*

Be it known that I, LEO C. OTTO, a citizen of the United States, residing at Duluth, in the county of St. Louis and State of Minnesota, have invented certain new and useful Improvements in Tripods, of which the following is a specification.

My invention relates to improvements in tripods particularly adapted for supporting a camera; and one object of my invention is the provision of a tripod which can be folded and carried in a case after the manner of a cane and which will be very light in weight to enable easy carrying of the same.

Another object of my invention is the provision of a tripod which will form a perfect support for the camera when in use and which may be instantly set up and adjusted to the desired requirements and which will perform its functions in an efficient and practical manner.

Another object of my invention is the provision of a tripod which can when not in use perform the function of a cane, which can be quickly set up for use or stored in the casing when not desired, and which can be produced at a very low price.

To attain the desired objects, my invention consists of a camera-support or tripod embodying novel features of construction and combination of parts, substantially as disclosed herein.

Figure 1 represents a sectional view of the casing with the tripod in elevation and folded within said casing. Figs. 2 and 3 represent detail views of the cap or cover of the casing. Fig. 4 represents a detail view of the rigid members or arms of my tripod, and Fig. 5 represents a perspective view of my tripod adjusted to receive and support a camera.

In said drawings the letter A designates the casing, of tubular, conical, or tapering form, after the manner of a cane, having the enlarged mouth provided with a shoulder B and a contiguous rim C, upon which rim fits the depending collar D of the cap E, having the wall F formed with a central opening G. Arranged within the casing is my tripod, which consists of the circular disk or support H, formed on its upper side with a threaded stem J, which when in use engages the camera and when not in use fits in the opening of the cap, and depending from said support are the series of angular wings K, which form recesses L to receive and pivot the upper ends of the angular hollow arms M. These arms are preferably made of thin metal and taper toward their lower ends, and in the lower ends fit the legs or supports N, which legs or supports are held simply by frictional contact in the arms and may be adjusted to support the camera at any desired adjustment, and the legs are tapered toward their lower ends in order that the arms and legs may be folded to form a tubular tapering form which will neatly fit within the casing.

From the description and drawings it is evident that I provide a tripod which will be capable of use as a cane and which can be instantly adjusted to provide a perfect tripod or support. It will also be noticed that the tripod can be adjusted to suit the occasion and that I dispense entirely with set-screws or similar devices for adjusting the tripod, as my device is retained in any desired adjustment simply by frictional contact. It will also be apparent that my tripod can be manufactured at a price to place it within reach of all desiring such a device and that it is efficient and practical in every particular.

I claim—

1. A tripod or camera-support, consisting of a tubular conical casing, a folding tripod composed of a series of angular sections of tapering form arranged in said casing and a cap for covering the casing and securing and protecting the tripod by engaging the casing and tripod.

2. A tripod or camera-support, consisting of a hollow casing, a supporting-plate, a series of adjustable camera-supports pivoted to said plate, a threaded stem projecting upward from the plate, and a cap engaging the said stem and casing.

3. A tripod or camera-support, consisting of a hollow casing, a cap fitting on said casing and having a threaded central opening, a tripod arranged in the casing, a plate supporting the tripod and provided with a threaded stem engaging the threaded opening of the cap to secure the tripod and cap.

In testimony whereof I affix my signature in presence of two witnesses.

LEO C. OTTO.

Witnesses:
THOMAS J. DAVIS,
WM. H. LAMSON.